US007266894B1

(12) United States Patent
Hinckley

(10) Patent No.: US 7,266,894 B1
(45) Date of Patent: Sep. 11, 2007

(54) APPARATUS FOR SLICING FRUIT AND OTHER ITEMS

(76) Inventor: John Robert Hinckley, 2473 N. Field St., Apt. 3113, Dallas, TX (US) 75201

( * ) Notice: Subject to any disclaimer, the term of this patent is extended or adjusted under 35 U.S.C. 154(b) by 0 days.

(21) Appl. No.: 11/435,009

(22) Filed: May 16, 2006

(51) Int. Cl.
*B26B 3/04* (2006.01)
*A22B 5/16* (2006.01)

(52) U.S. Cl. ........................ 30/302; 30/303; 30/305; 30/312; 30/337; 83/932; 99/509; 99/537

(58) Field of Classification Search ............... 30/302, 30/312, 316, 114, 301, 303, 315, 320, 113.1, 30/123.5, 337; D7/673, 672; 99/430, 538, 99/509, 537, 556; 83/404.3, 662, 435.15, 83/856, 857, 837, 451, 569, 431, 932
See application file for complete search history.

(56) References Cited

U.S. PATENT DOCUMENTS

| | | | | | |
|---|---|---|---|---|---|
| 126,426 | A | * | 5/1872 | Thurston et al. | 30/302 |
| 206,279 | A | * | 7/1878 | Palmer | 42/21 |
| 293,542 | A | * | 2/1884 | Victor | 30/303 |
| 452,789 | A | * | 5/1891 | Hutchinson | 30/303 |
| 983,969 | A | * | 2/1911 | Zahn | 30/303 |
| 1,581,310 | A | * | 4/1926 | Fetschan | 30/303 |
| 1,595,574 | A | * | 8/1926 | Quevli | 30/302 |
| 2,397,007 | A | * | 3/1946 | Hosmer | 30/302 |
| 2,645,262 | A | * | 7/1953 | Marasco | 83/435.15 |
| 2,733,746 | A | * | 2/1956 | Rauner | 99/508 |
| 2,852,053 | A | * | 9/1958 | Berry et al. | 83/435.15 |
| 2,912,757 | A | * | 11/1959 | Knight | 30/303 |
| 3,060,838 | A | * | 10/1962 | Priore | 99/430 |
| 3,128,810 | A | * | 4/1964 | Whipp | 99/545 |
| 3,132,423 | A | * | 5/1964 | De Lano | 30/114 |
| 3,830,151 | A | * | 8/1974 | Gerson | 99/537 |
| 4,029,319 | A | * | 6/1977 | Christen | 473/584 |
| 4,436,025 | A | * | 3/1984 | Jones | 99/538 |
| 4,516,460 | A | * | 5/1985 | Vizecky | 83/861 |
| 4,959,903 | A | * | 10/1990 | Daoust et al. | 30/123.5 |
| 5,337,480 | A | * | 8/1994 | Codikow | 30/114 |
| 5,363,756 | A | * | 11/1994 | Muro | 99/538 |
| 5,446,965 | A | * | 9/1995 | Makridis | 30/303 |
| D521,819 | S | * | 5/2006 | So et al. | D7/673 |

* cited by examiner

*Primary Examiner*—Boyer D. Ashley
*Assistant Examiner*—Ghassem Alie
(74) *Attorney, Agent, or Firm*—Jackson Walker L.L.P.; Christopher J. Rourk

(57) ABSTRACT

An apparatus for slicing fruit or other items is provided. The apparatus includes a top interlocking blade, a middle interlocking blade, and a bottom interlocking blade, each having an apex and two downward sloping edges of approximate equal length. The blades have slots at each side that fit into slots in a circumferential ring. The blades form a cutting surface within the circumferential ring that allows a lime or other item to easily cut into equal-sized sections.

5 Claims, 4 Drawing Sheets

APPARATUS FOR SLICING FRUIT AND OTHER ITEMS

FIELD OF THE INVENTION

The present invention pertains to the field of cutting utensils, and more particularly to an apparatus for slicing fruit, such as limes, or other items.

BACKGROUND OF THE INVENTION

Cutting utensils for cutting fruit or other items are well known in the art. While many applications can be accomplished using a single bladed knife, different utensils have been produced for specific cutting purposes. For example, cutting utensils for coring apples, peeling potatoes, and other purposes are known. Nevertheless, there are many applications where the use of a single bladed knife teaches away from the development of a specialized cutting utensil.

SUMMARY OF THE INVENTION

In accordance with the present invention, an apparatus for slicing fruit and other items is provided that overcome known problems with utensils for slicing fruit.

In particular, an apparatus for slicing fruit and other items is provided that allows limes or other juice-producing fruits to be held still while being cut without risking injury to the human operator, and which results in equally-proportioned sections that would otherwise be difficult to produce.

In accordance with an exemplary embodiment of the present invention, an apparatus for slicing fruit or other items is provided. The apparatus includes a top interlocking blade, a middle interlocking blade, and a bottom interlocking blade, each having an apex and two downward sloping edges of approximate equal length. The blades have slots at each side that fit into slots in a circumferential ring. The blades form a cutting surface within the circumferential ring that allows a lime or other item to easily cut into equal-sized sections.

The present invention provides many important technical advantages. One important technical advantage of the present invention is a cutting utensil that produces slices of a lime or other object of approximately equal size, with a base that holds the lime or other object steady during cutting, and with a blade structure that can be readily assembled and that facilitates the cutting of the object.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
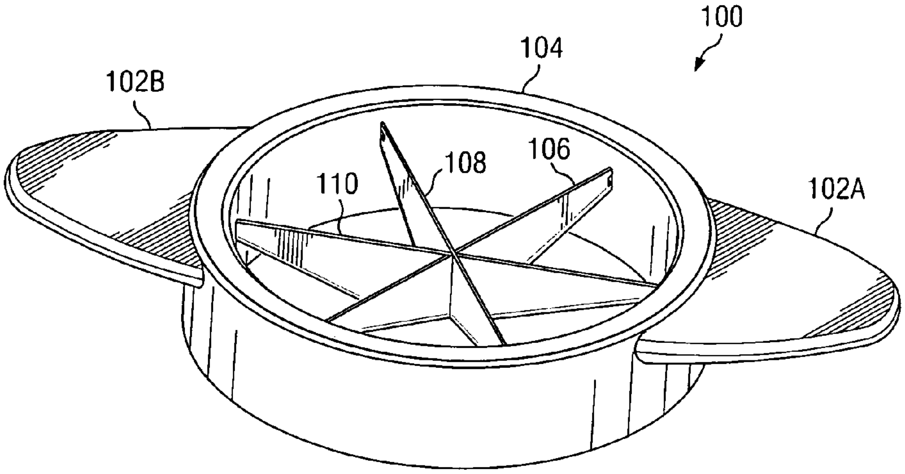
FIG. 1 is a diagram of a lime slicer in accordance with an exemplary embodiment of the present invention.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a lime slicer 100 in accordance with an exemplary embodiment of the present invention. Lime slicer 100 allows limes or other fruits, vegetables, foods or other suitable objects to be easily sliced into equal sized portions.

Lime slicer 100 includes handles 102A and 102B, which are diametrically opposed on circumferential ring 104. Circumferential ring 104 has a suitable radial thickness to provide structural support for handles 102A and 102B and blades 106, 108, and 110. Blades 106, 108 and 110 interlock and fit into circumferential ring 104 so as to form a stable cutting surface having predetermined sections. These sections can be equal in dimension, as shown in FIG. 1, or can be varied in size where suitable. Likewise, a fewer or additional number of blades can be used where suitable, circumferential ring 104 can be shaped to accommodate a suitable item of food or other object (e.g. egg-shaped, star shaped, or elliptical shaped).

Handles 102A and 102B and circumferential ring 104 can be formed from injection molded plastic, or other suitable materials such as wood, marble, granite, or other suitable ornamental materials having sufficient material strength to withstand the forces applied when lime slicer 100 is used to slice food. Likewise, blades 106, 108, and 110 can be formed from carbon steel or other suitable metallic or non-metallic substances, as long as the materials from which blades 106, 108, and 110 are formed have sufficient material strength to cut the food or other objects that are sliced by an operator of lime slicer 100.

In operation, lime slicer 100 is placed over an object that is to be sliced, such as a lime, lemon, apple, onion, or other suitable food or non-food object. The user then exerts downward force on handles 102A and 102B so as to cause blades 106, 108, and 110 to slice the lime or other suitable food or object into six evenly sized portions. Ring 104 should have a sufficient diameter to surround the food object being sliced, such as to hold the sections formed by blades 106, 108, and 110 in position as the food object is being sliced.

In this manner, lime slicer 100 can be used to create ornamental and consistently-sized food portions for use in the food service and preparation industries, such as for use in drinks, as garnishments, or in other suitable applications.

Figure 2:
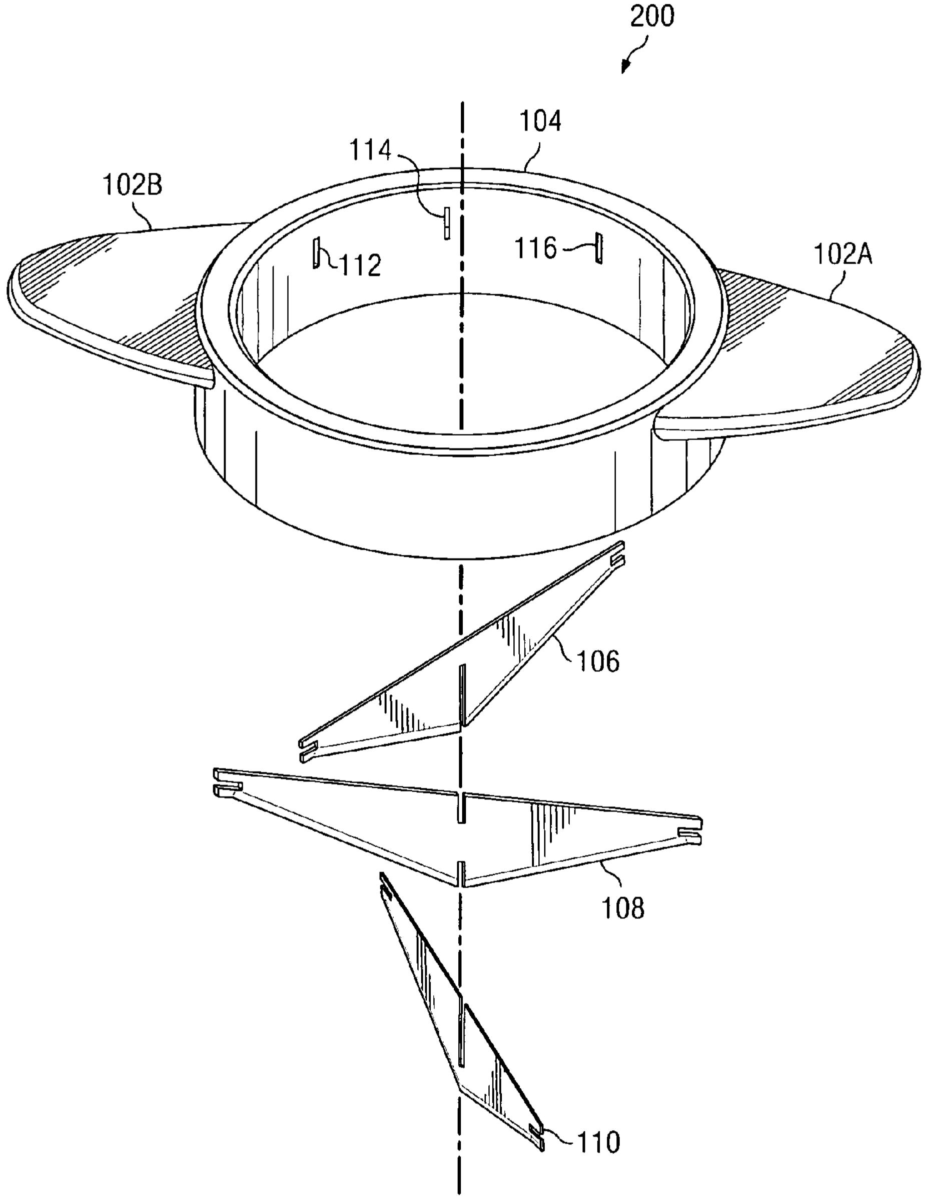
FIG. 2 is an exploded view of a lime slicer in accordance with an exemplary embodiment of the present invention.

FIG. 2 is an exploded view of lime slicer 200 in accordance with an exemplary embodiment of the present invention. Exploded view 200 shows handles 102A and 102B attached and extending outward directly from circumferential ring 104. Likewise, blades 106, 108, and 110 are shown in exploded fashion, whereas the slot on blade 106 is shown aligning with the slot on the bottom of blade 108, and the slot on the top of blade 108 is shown aligning with the slot on the bottom of blade 110. In this manner, the three blades 106, 108, and 110 fit together so as to form a stable cutting surface.

In addition, it can be noted in FIG. 2 that blades 106, 108, and 110 have a slant starting at a slot at the far end of each blade which fits into circumferential ring 104 at slots 112, 114, and 116 and at additional corresponding slots diametrically opposed to slots 112, 114 and 116, and reaching an apex at the center where the three blades fit together. This slant allows the force exerted by the user of lime slicer 200 to be concentrated at a point, so as to facilitate the ease of penetration of the blades into the lime or other food object. Likewise, the use of mating slots for blades 106, 108 and 110 into circumferential ring 104 provides for a sturdy and easily assembled blade structure.

Figure 3:
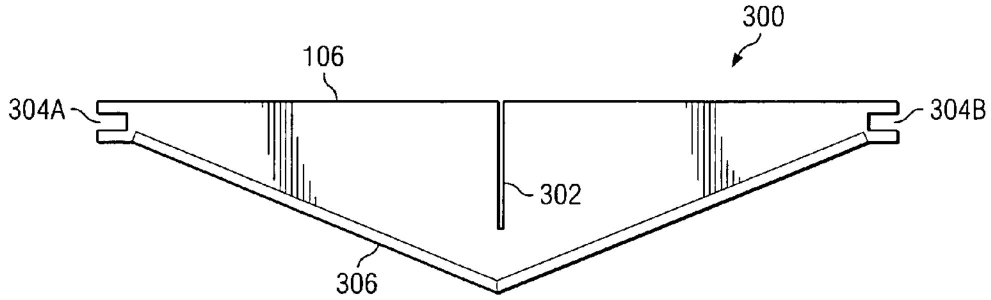
FIG. 3 is a diagram of top blade in accordance with an exemplary embodiment of the present invention.

FIG. 3 is a diagram of top blade 300 in accordance with an exemplary embodiment of the present invention. Top blade 300 includes a slot in the lower portion of the top blade having a depth 302. The depth 302 is coordinated with slots on the middle and bottom blades 108 and 110, respectively. Likewise, top blade 300 has a point 306 that is higher than the point of blades 108 and 110, such as to allow an initial cut to be made into the food or other object so as to stabilize the cutting action of the remaining blades. Blade 106 further includes slotted portions 304A and 304B, which are configured to fit into corresponding slots, such as slots 112, 114, and 116 in circumferential ring 104. These corresponding slots can be evenly spaced or offset as desired to form sections having desired dimensions.

Figure 4:
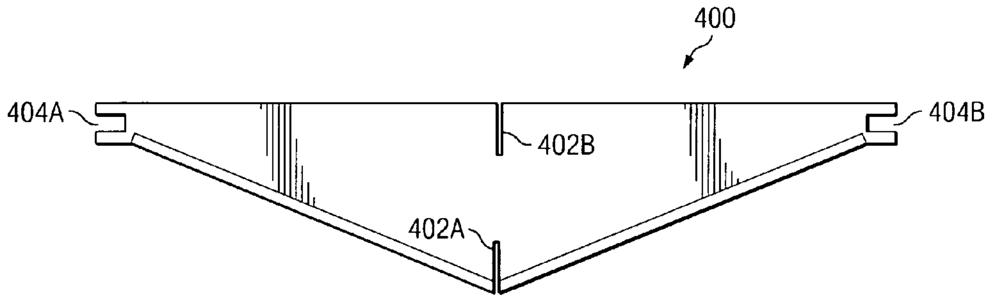
FIG. 4 is a diagram of a middle blade in accordance with an exemplary embodiment of the present invention.

FIG. 4 is a diagram of a middle blade 400 in accordance with an exemplary embodiment of the present invention. Blade 400 includes slots 402A and 402B, having dimensions such that slot 402A fits within slot 302 of blade 300. Likewise, slot 402B is dimensioned so as to interface with the bottom blade 110. Likewise, blade 400 includes slots 404A and 404B, which are configured to fit into corresponding slots, such as slots 112, 114, and 116 in circumferential ring 104.

Figure 5:
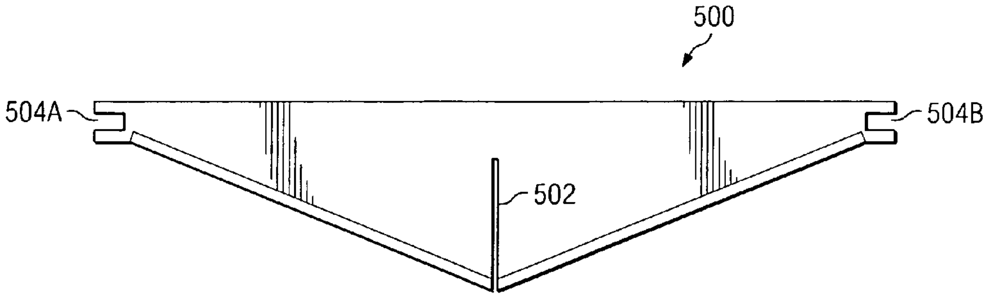
FIG. 5 is a diagram of a bottom blade in accordance with the exemplary embodiment of the present invention.

FIG. 5 is a diagram of a bottom blade 500 in accordance with the exemplary embodiment of the present invention. Bottom blade 500 includes slot 502, which has suitable dimensions to allow it to interface with middle blade 400. Likewise, circumferential slots 504A and 504B, which are configured to fit into corresponding slots, such as slots 112, 114, and 116 in circumferential ring 104.

In operation, blades 300, 400, and 500 interlock so as to form the cutting surface of lime slicers 100 or 200. The angle of blades 300, 400 and 500 reaches an apex at a point where the lime slicer 100 or 200 will penetrate the lime or other object to be sliced. Thereafter, application of force allows the blade to slice through the object while maintaining stability of the object so as to ensure that a uniformed section of the object is cut.

Figure 6:
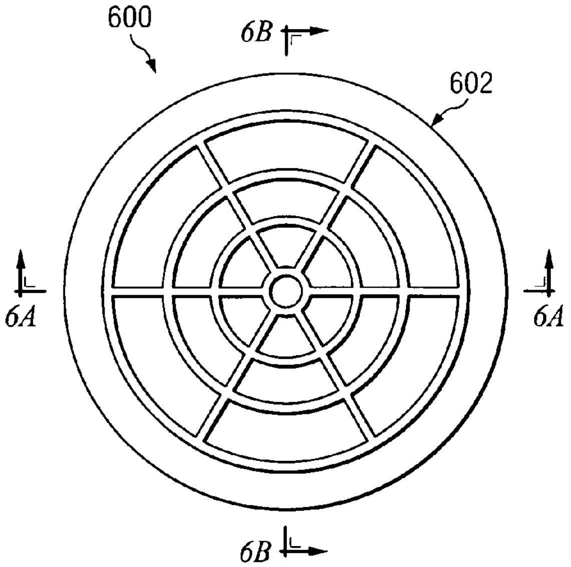
FIGS. 6, 6A, 6B, 6C and 6D are diagrams of a base for use in conjunction with a lime slicer or in accordance with the exemplary embodiment of the present invention.

FIG. 6 is a diagram of a base 600 for use in conjunction with a lime slicer 100 or 200 in accordance with the exemplary embodiment of the present invention. Base 600 is shown in overhead view at 602, with section cuts A and B showing. In overhead view 602, it can be seen that base 600 has a center at which the food object to be cut is placed. The diameter of the food object should not exceed the diameter of base 602, which is also coordinated with the diameter of circumferential ring 104 so as to interlock with lime slicer 100 or 200 when lime slicer 100 or 200 is moved downwards to the full extended position so as to mate with base 600.

Figure 6A:
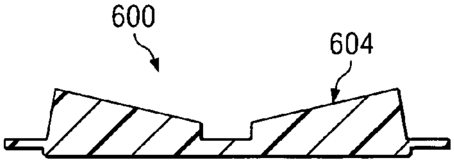

FIG. 6A is shown with side view 604 of base 600. As can be seen, side view 604 demonstrates the configuration of base 600 that allows the sloping sides of base 600 to hold the food or other object steady while it is being sliced. It should also be noted that the slope of the sides of cross section 604 correspond to the slope of the blades of the cutting unit of lime slicer 100 or 200, so as to allow the blades to stop just short of the surface of base 600 when circumferential ring 104 is adjacent to base 600. In this manner, circumferential ring 104 can be sized so as to snugly fit onto base 600, so as to allow the two parts to be easily stored and to protect the blades of lime slicer 100 or 200 when not in use.

Figure 6C:
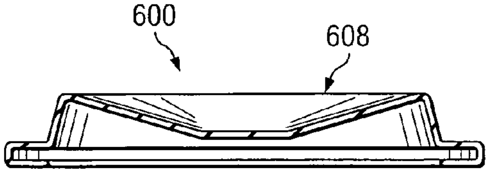
Figure 6B:
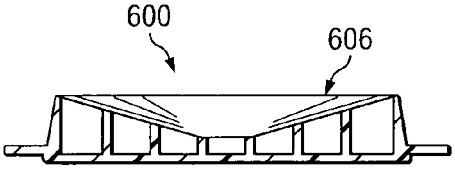
Figure 6D:
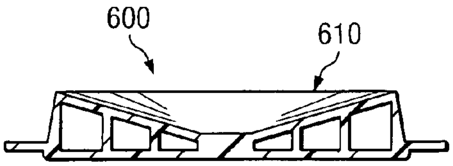

FIG. 6B shows base part 606 as an exemplary cut-away view of an exoskeleton for the base showing support ribs staggered evenly across the base. FIG. 6C shows that cover 608 is configured so as to fit over support base 606. Cover 608 can be formed from a suitable replaceable material, such as a polymer or rubber material, and can also be elastic so as to be stretched to fit over and grip support base 606. FIG. 6D shows an exemplary embodiment of the assembled cover and support base at 610.

In operation, lime slicer 100 or 200 allows a user to easily slice a lime, food or objects into predetermined and equal sections, using minimal force, and without risk of bodily injury or creation of undue mess. Base 600 forms a holding section for the object to be sliced and any juices that may be generated during the slicing process. The angle of interlocking blades 106, 108, and 110 allows the item to be sliced to be readily penetrated and sliced with little effort, so as to prevent slippage of the lime or other item to be sliced during slicing that would result in an unattractive or imbalanced sectioning of the item to be sliced. Thus, lime slicer 100 or 200 in operation with base 600 form a complete system for slicing limes, other fruits, other vegetables, or other objects into sections with minimal force and with minimal risk and mess.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. An apparatus for slicing edible items comprising:

a top interlocking blade having an apex and two downward sloping blade edges of approximate equal length, the top interlocking blade having a central slot aligned with the apex and extending from a bottom edge of the top interlocking blade a predetermined distance towards the apex, the top interlocking blade further having two side slots;

a middle interlocking blade having an apex and two downward sloping blade edges of approximate equal length, the middle interlocking blade having a top slot aligned with the apex and extending from the apex downwards so as to interlock with the top interlocking blade and a bottom slot aligned with the apex and extending from a bottom edge of the middle interlocking blade towards the apex a predetermined distance, the middle interlocking blade further having two side slots;

a bottom interlocking blade having an apex and two downward sloping blade edges of approximate equal length, the bottom interlocking blade having a slot aligned with the apex and extending from the apex downwards so as to interlock with the bottom slot of the middle interlocking blade, the bottom interlocking blade further having two side slots; and a circumferential ring having a diameter equal to a length of the top interlocking blade, the middle interlocking blade, and the bottom interlocking blade, the circumferential ring further having six slots configured so as to interlock with the side slots of the top interlocking blade, the middle interlocking blade, and the bottom interlocking blade.

2. The apparatus of claim 1 wherein the height of the apex of the top interlocking blade is slightly greater than the height of the middle interlocking blade and the bottom interlocking blade, so as to provide a cutting edge that first penetrates an object to be cut, so as to stabilize the object.

3. The apparatus of claim 1 further comprising a base having a diameter approximately equal to the diameter of the circumferential ring, so as to form a snug fit with the circumferential ring when the circumferential ring is placed on top of the base.

4. The apparatus of claim 3 wherein the base further comprises downward sloping sides so as to provide a stable surface on which to place an item to be sliced.

5. The apparatus of claim 4 wherein an angle of the downward sloping sides is equal to an angle of the downward sloping blade edges of the top interlocking blade, the middle interlocking blade, and the bottom interlocking blade.

* * * * *